United States Patent
Wang et al.

(10) Patent No.: US 7,098,968 B2
(45) Date of Patent: Aug. 29, 2006

(54) TV IMAGE CONVERSION DEVICE FOR TURNING COMPUTER ON OR OFF BY MEANS OF MULTIMEDIA REMOTE CONTROL

(75) Inventors: Chen Ming Wang, Taipei (TW); Hsien Yao Hsieh, Taipei (TW); Hung Chih Huang, Taipei (TW)

(73) Assignee: Elitegroup Computer Systems, Co., Ltd., Taipei (TW)

( * ) Notice: Subject to any disclaimer, the term of this patent is extended or adjusted under 35 U.S.C. 154(b) by 588 days.

(21) Appl. No.: 10/404,119

(22) Filed: Apr. 2, 2003

(65) Prior Publication Data

US 2004/0160534 A1 Aug. 19, 2004

(30) Foreign Application Priority Data

Feb. 17, 2003 (TW) .............................. 92103206 A

(51) Int. Cl.
*H04N 5/44* (2006.01)
*G09F 5/00* (2006.01)

(52) U.S. Cl. ...................... 348/734; 348/552; 348/730; 345/211

(58) Field of Classification Search ................ 348/552, 348/734; 345/211; H04N 5/44; G09F 5/00
See application file for complete search history.

(56) References Cited

U.S. PATENT DOCUMENTS

| | | | | |
|---|---|---|---|---|
| 5,192,999 A | * | 3/1993 | Graczyk et al. | ............ 348/552 |
| 5,790,201 A | * | 8/1998 | Antos | .......................... 348/552 |
| 5,819,156 A | * | 10/1998 | Belmont | ....................... 725/14 |
| 5,880,721 A | * | 3/1999 | Yen | .............................. 725/81 |
| 5,926,175 A | * | 7/1999 | Sturgeon et al. | ............ 715/716 |
| 6,008,777 A | * | 12/1999 | Yiu | ............................. 345/2.1 |
| 6,041,225 A | * | 3/2000 | Jung | .......................... 455/352 |
| 6,084,638 A | * | 7/2000 | Hare et al. | ................... 348/552 |
| 6,119,172 A | * | 9/2000 | Belmont et al. | ............ 709/250 |
| 6,239,845 B1 | * | 5/2001 | Itagaki et al. | ............... 348/552 |
| 6,285,406 B1 | * | 9/2001 | Brusky | ........................ 348/552 |
| 6,373,503 B1 | * | 4/2002 | Perkes | .......................... 715/718 |
| 6,377,861 B1 | * | 4/2002 | York | ........................... 700/83 |
| 6,516,467 B1 | * | 2/2003 | Schindler et al. | ............ 725/153 |
| 6,529,680 B1 | * | 3/2003 | Broberg | ....................... 386/83 |
| 6,564,383 B1 | * | 5/2003 | Combs et al. | .............. 725/136 |
| 6,791,467 B1 | * | 9/2004 | Ben-Ze'ev | ............. 340/825.69 |
| 6,802,076 B1 | * | 10/2004 | Terakado et al. | ............. 725/38 |
| 6,836,296 B1 | * | 12/2004 | Terakado et al. | ........... 348/552 |
| 6,882,352 B1 | * | 4/2005 | Terakado et al. | ........... 715/717 |
| 6,967,588 B1 | * | 11/2005 | Zustak et al. | .......... 340/825.22 |
| 6,980,150 B1 | * | 12/2005 | Conway et al. | ............. 341/176 |
| 2002/0066112 A1 | * | 5/2002 | Yearwood | ................... 725/141 |

* cited by examiner

*Primary Examiner*—Brian P. Yenke
(74) *Attorney, Agent, or Firm*—Bacon & Thomas, PLLC

(57) ABSTRACT

The present invention is to provide a TV image conversion device for turning a computer on or off by means of a multimedia remote control. The TV image conversion device is electrically coupled to a computer enabling a user to operate a computer on-off switch on the multimedia remote control to turn the computer on or off wirelessly rather than walk to a computer to either turn the computer on or off by pressing an on/off switch on the computer. By utilizing this, the above drawback of incapable of turning a computer on or off by means of a remote control as experienced by the prior art can be overcome.

11 Claims, 5 Drawing Sheets

TV IMAGE CONVERSION DEVICE FOR TURNING COMPUTER ON OR OFF BY MEANS OF MULTIMEDIA REMOTE CONTROL

FIELD OF THE INVENTION

The present invention relates to a remote control of a computer and more particularly to a TV (television) image conversion device (e.g., TV card, a set-top box, or the like) for turning the computer on or off by means of a multimedia remote control.

BACKGROUND OF THE INVENTION

Users, especially employees involved in using computers, may sit in front of the computer for hours of every day. Such work can be tedious. For the purpose of entertainment a person may like to listen to news and/or music, play games, watch VCD (video compact disc) movies, or even watch TV while working or during breaks. In this regard, a person may install one or more additional peripherals (e.g., accelerator card, CD-ROM (compact disc-read only memory) driver, TV image conversion device, or the like) and their associated software in the computer. Such peripherals do not occupy precious space on a user's desk. Also, a user can run an audio-video (AV) playing software or image fetching software to play a VCD for watching movies as well as recording the same. Particularly, the TV image conversion devices such as internal TV cards or external set-top boxes available from some manufacturers have a feature of picture in picture in associated software which is sold for a fee or for free. Hence, a user can use the computer while watching a TV program. Thus, a wide variety of TV image conversion devices are produced by computer peripheral manufacturers. Further, TV image conversion devices are gaining popularity among many computer users.

Conventionally, a multimedia remote control is free when a user buys a TV card having many powerful features. Also, the user has to install multimedia software after mounting the TV card in a computer. Thereafter, the user can turn on the computer to run the software to play a VCD to watch a movie or watch TV. Also, the user can operate the multimedia remote control to select a desired channel for watching or adjusting volume. In case the user does not want to play the VCD or watch TV any more and wants to stop using the computer, the user has to stop running the multimedia software and perform the necessary shutdown step prior to turning off an on/off switch on the computer. This is in contrast to turn off of a domestic appliance, which is a simple operation involving aiming a remote control at the domestic appliance. As such, it is typical that a user has to rise to walk to a computer to either turn the computer on by pressing the on/off switch or perform the shutdown step prior to turning the computer off by pressing the on/off switch rather than operate a remote control to do the same in one operation. Hence, the above computer turning on/off procedure is not user friendly for many users who are familiar with the operation of domestic appliances.

Thus, it is desirable among TV image conversion device designers and manufactures to provide a novel TV image conversion device for fulfilling the needs of vast users.

SUMMARY OF THE INVENTION

A primary object of the present invention is to provide a TV image conversion device for turning a computer on or off by means of a multimedia remote control. The TV image conversion device is electrically coupled to a computer. A user can operate a computer on-off switch on the multimedia remote control to turn the computer on or off wirelessly rather than walk to a computer to either turn the computer on or off by pressing an on/off switch on the computer. By utilizing this, the above drawback of incapable of turning a computer on or off by means of a remote control as experienced by the prior art can be overcome.

In one aspect of the present invention, the TV image conversion device comprises a wireless signal receiver for receiving a turn-on or turn-off signal transmitted from the multimedia remote control and a wireless signal decoder for converting the turn-on or turn-off signal into a control signal. In response to pressing the computer on-off switch, the multimedia remote control is enabled to generate a turn-on or turn-off signal which is transmitted to the wireless signal receiver for receiving, the turn-on or turn-off signal is sent from the wireless signal receiver to the wireless signal decoder for converting the turn-on or turn-off signal into a control signal which is sent to a predetermined pin in the computer for enabling, the enabled pin is capable of generating a trigger signal of either converting a high voltage level into a low voltage level or converting a low voltage level into a high voltage level, and the computer is enabled by the trigger signal to perform a turn-on or turn-off step.

In another aspect of the present invention, the TV image conversion device is coupled to the computer. In response to pressing the on/off switch on the computer for powering the computer on, a setup program in an embedded BIOS of the computer is operative to run to enable a corresponding pin in the computer based on state of a signal line connected between the TV image conversion device and the computer. Hence, the TV image conversion device can be enabled when resetting the computer. Therefore, a user can turn the computer on or off by operating the multimedia remote control.

The above and other objects, features and advantages of the present invention will become apparent from the following detailed description taken with the accompanying drawings.

DETAILED DESCRIPTION OF THE PREFERRED EMBODIMENTS

Figure 1:
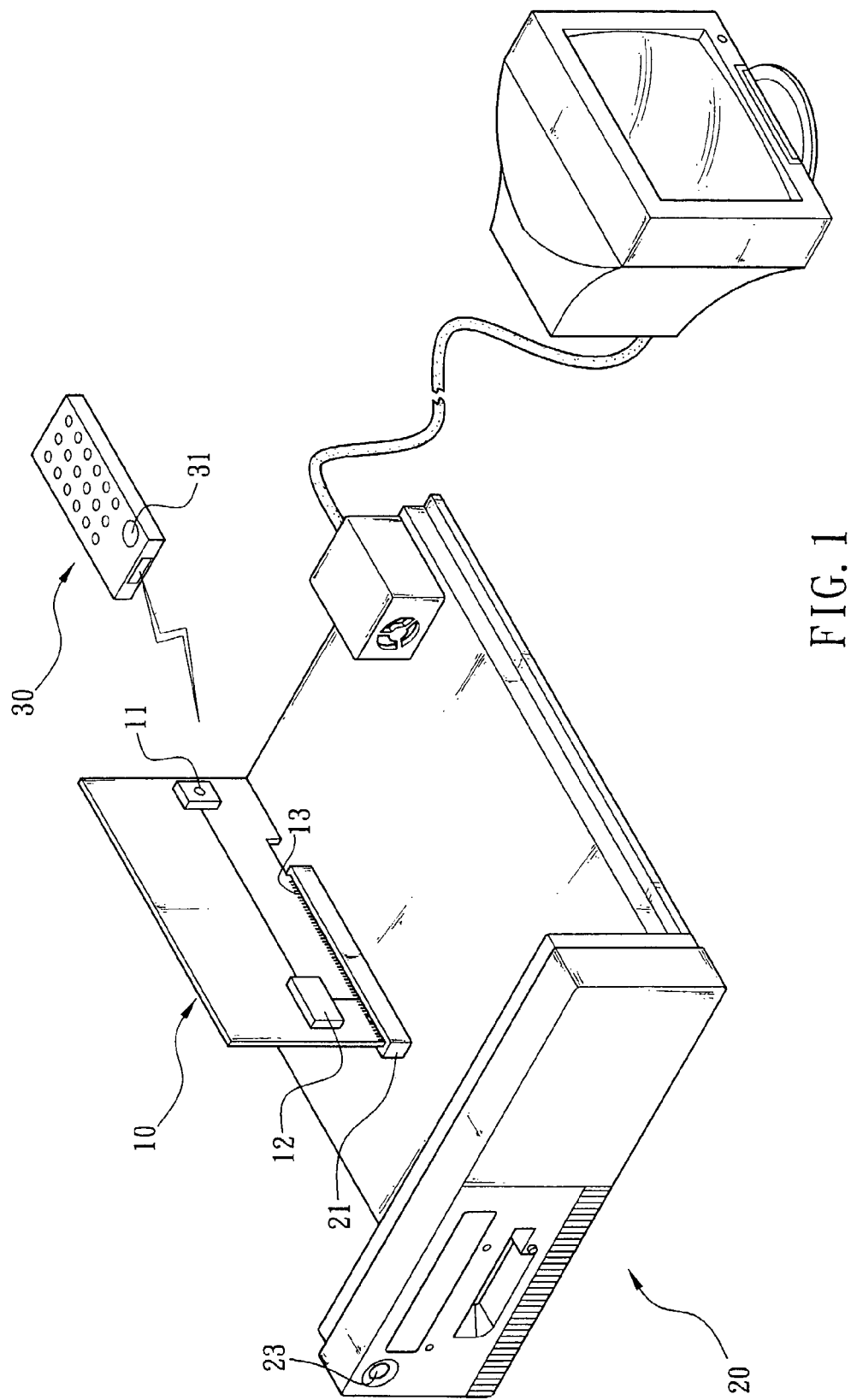
FIG. 1 is a perspective view schematically showing a TV image conversion device mounted in a computer, the TV image conversion device being operative to be enabled by a multimedia remote control according to the invention.
Figure 2:
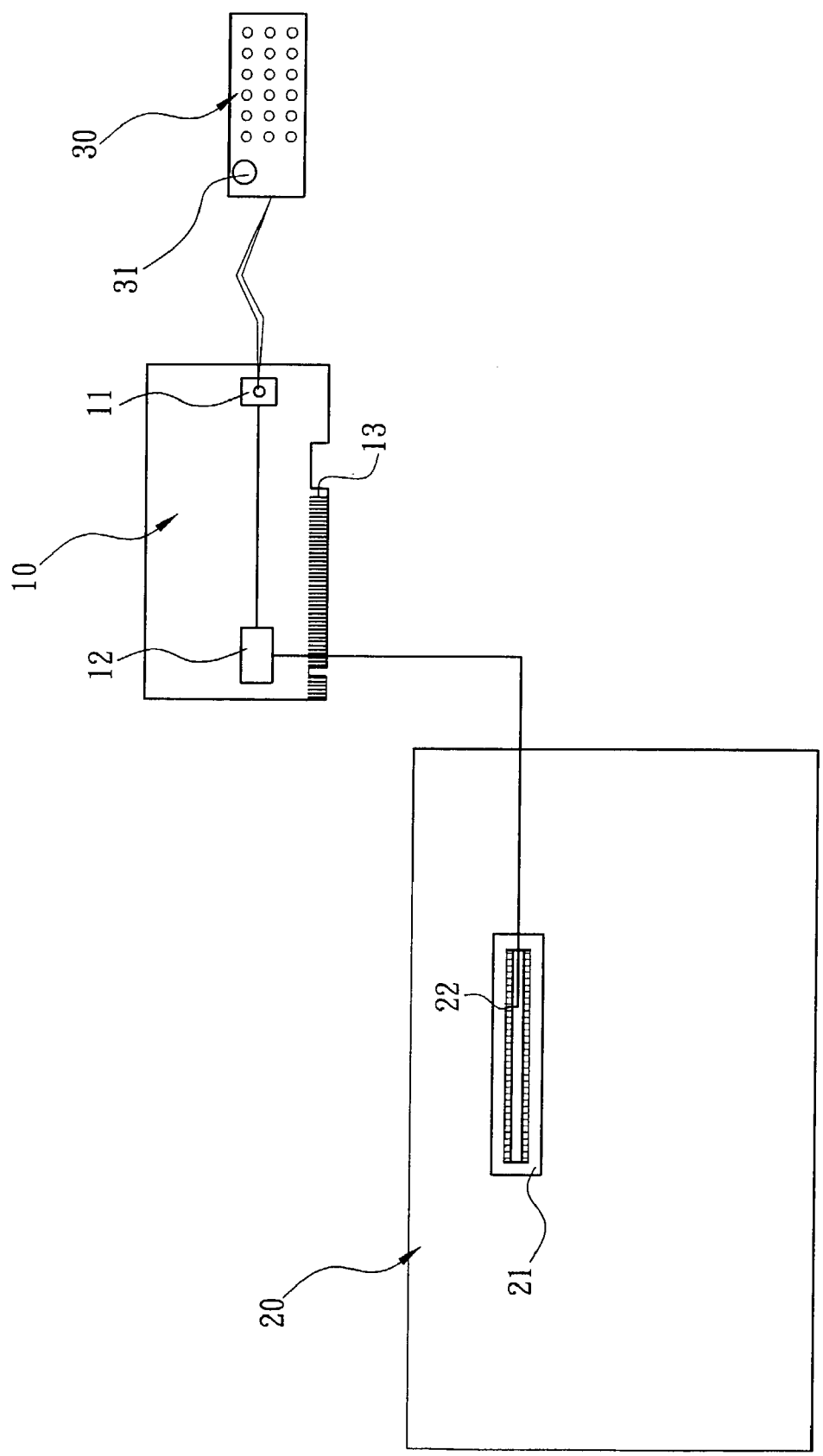
FIG. 2 is a side view schematically illustrating an electrical connection of the components shown in FIG. 1 according to a first preferred embodiment of the invention.

The invention is directed to a TV image conversion device for turning a computer on or off by means of a multimedia remote control. Referring to FIG. 1, there is shown a perspective view of a TV image conversion device (e.g., TV card) 10 inserted in an expansion slot 21 on a circuit board inside a computer 20 in accordance with the invention. The TV card 10 comprises a wireless signal receiver 11 and other control circuits and components which are not pertinent to the invention. Thus a detailed description thereof is omitted herein for the sake of brevity. The wireless signal receiver 11 is adapted to receive signals transmitted from a multimedia remote control 30. The multimedia remote control 30 comprises a computer on-off switch 31 which can be pressed to cause the multimedia remote control 30 to generate a turn-on or turn-off signal. The signal is then transmitted to the wireless signal receiver 11 for receiving. The signal is in turn sent from the wireless signal receiver 11 to a wireless signal decoder 12 on the TV card 10. The wireless signal decoder 12 is adapted to convert the on/off signal into a control signal which is in turn sent to a control circuit and a bus (so called gold fingers) 13 on the TV card 10. Referring to FIG. 2, the control signal is then sent to a predetermined pin 22 in the expansion slot 21 from the bus 13. The pin 22 is enabled to generate a trigger signal of either converting a high voltage level into a low voltage level or converting a low voltage level into a high voltage level. The computer 20 thus is enabled by the trigger signal to perform the turn-on or turn-off step. Hence, a user can turn on or off the computer 20 by simply pressing the computer on-off switch 31 on the multimedia remote control 30 rather than pressing an on-off switch 23 on the computer 20.

Referring to FIGS. 1 and 2 again, in a first preferred embodiment of the invention the TV card 10 is a TV card having a PCI (peripheral component interconnect) bus 13. The TV card 10 is inserted in the PCI compatible expansion slot 21 of the computer 20. It is appreciated by those skilled in the art that in practice the TV image conversion device of the invention can be mounted in a computer without a PCI compatible expansion slot. In other words, a person skilled in the art may insert the TV card 10 in a computer having any of other compatible expansion slots without departing from the scope and spirit of the invention. After inserting the TV card 10 in the PCI compatible expansion slot 21, the user may press the on-off switch 23 on the computer 20 to turn on the computer 20 to enable an embedded basic input/output system (BIOS) of the computer 20. The enabled BIOS will run a setup program to set the pin 22 labeled PME on the PCI compatible expansion slot 21 as an enabled state based on state of a labeled PME signal line on the bus 13 of the TV card 10. Further, the enabled BIOS of the computer 20 activates the TV card 10 in the PCI compatible expansion slot 21. Thus, the TV card 10 can be enabled directly after the user has turned on the computer 20. In detail, a user may press the computer on-off switch 31 to cause the multimedia remote control 30 to generate a turn-on or turn-off signal. The signal is then transmitted to the wireless signal receiver 11 for receiving. The signal is in turn sent from the wireless signal receiver 11 to the wireless signal decoder 12 on the TV card 10. The wireless signal decoder 12 is able to convert the on/off signal into a control signal which is in turn sent to the bus (so called gold fingers) 13 on the TV card 10. The control signal is then sent to the labeled PME pin 22 in the expansion slot 21 from the bus 13. The labeled PME pin 22 is enabled to generate a trigger signal of either converting a high voltage level into a low voltage level or converting a low voltage level into a high voltage level. The computer 20 is thus enabled by the trigger signal to perform the turn-on or turn-off step.

Figure 3:
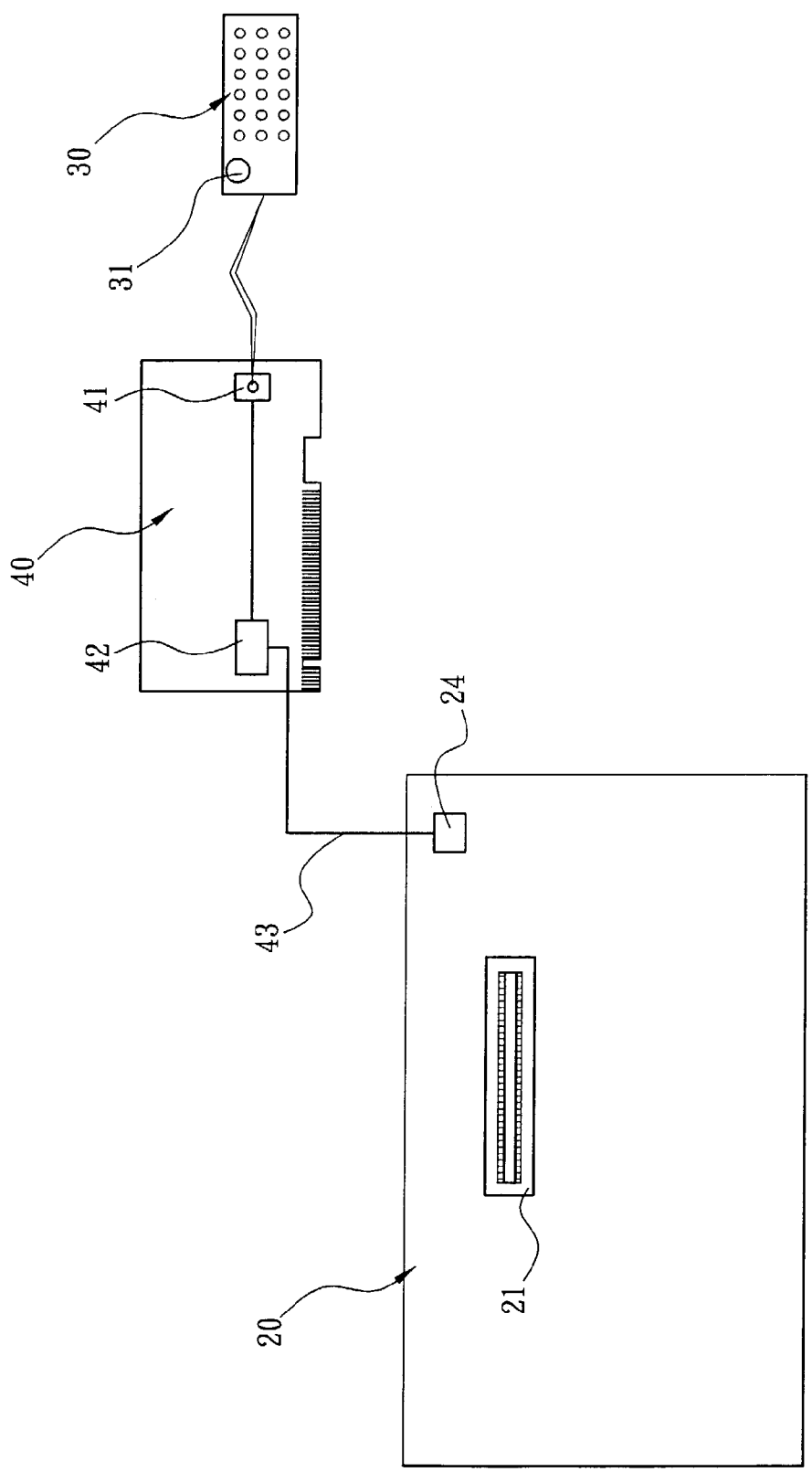
FIG. 3 is a view similar to FIG. 2 according to a second preferred embodiment of the invention.

Referring to FIG. 3, there is shown a second preferred embodiment of the invention. The TV image conversion device is implemented as a TV card 40. Similar to the first preferred embodiment, the TV card 40 is inserted in the expansion slot 21 on the computer 20. Also, the TV card 40 comprises a wireless signal receiver 41 and a wireless signal decoder 42. The wireless signal receiver 41 is adapted to receive signals transmitted from the multimedia remote control 30. The computer on-off switch 31 can be pressed to cause the multimedia remote control 30 to generate a turn-on or turn-off signal. The signal is then transmitted to the wireless signal receiver 41 for receiving. The signal is in turn sent from the wireless signal receiver 41 to the wireless signal decoder 42 for converting the on/off signal into a control signal which is in turn sent to a control circuit and a bus 43 on the TV card 40. The control signal is then sent to a predetermined pin 24 in the computer 20 from the bus 43. The pin 24 is enabled to generate a trigger signal of either converting a high voltage level into a low voltage level or converting a low voltage level into a high voltage level. The computer 20 is thus enabled by the trigger signal to perform the turn-on or turn-off step.

Figure 4:
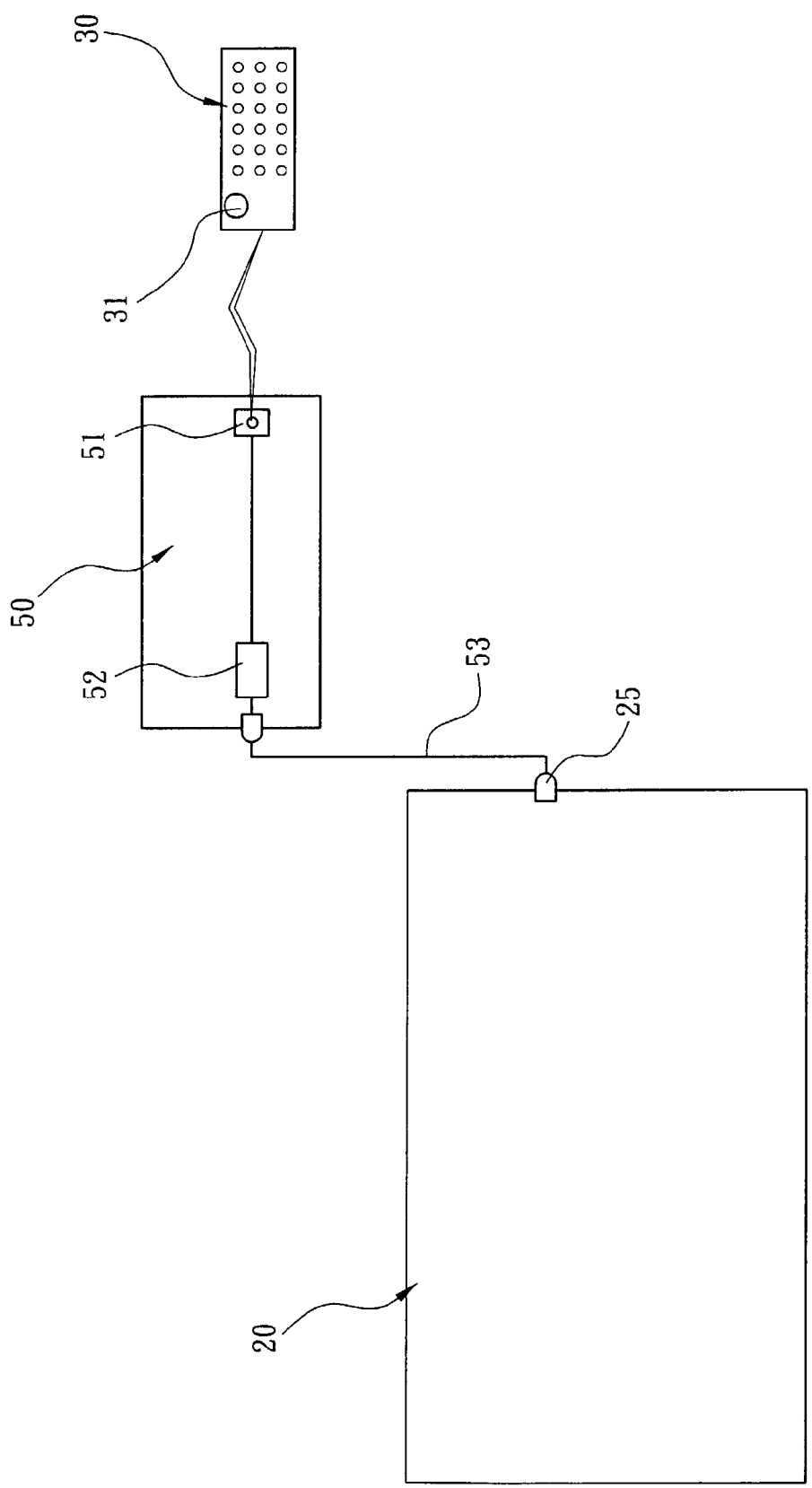
FIG. 4 is a view similar to FIG. 2 according to a third preferred embodiment of the invention.

Referring to FIG. 4, there is shown a third preferred embodiment of the invention. The TV image conversion device is implemented as an external set-top box 50. The set-top box 50 is electrically coupled to an I/O (input/output) port 25 (e.g., USB or PS/2 port) in the computer 20 by means of a signal line 53. In addition to basic control circuits and components, the set-top box 50 further comprises a wireless signal receiver 51 and a wireless signal decoder 52. The wireless signal receiver 51 is adapted to receive signals transmitted from the multimedia remote control 30. The computer on-off switch 31 can be pressed to cause the multimedia remote control 30 to generate a turn-on or turn-off signal. The signal is then transmitted to the wireless signal receiver 51 for receiving. The signal is in turn sent from the wireless signal receiver 51 to the wireless signal decoder 52 for converting the on/off signal into a control signal which is in turn sent to a control circuit and a signal line 53 on the set-top box 50. The control signal is then sent to a predetermined pin in an I/O port 25 of the computer 20 from the signal line 53. The predetermined pin is enabled to generate a trigger signal of either converting a high voltage level into a low voltage level or converting a low voltage level into a high voltage level. The computer 20 is thus enabled by the trigger signal to perform the turn-on or turn-off step.

Figure 5:
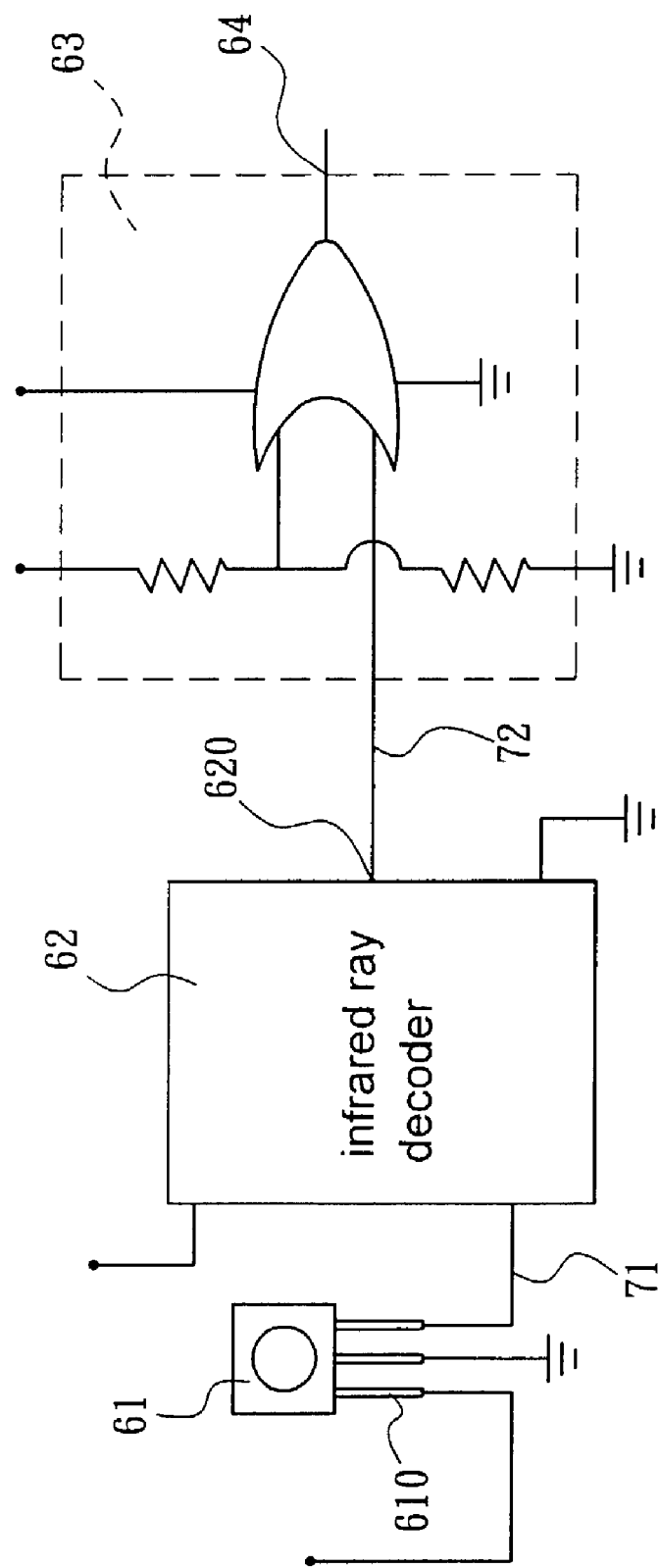
FIG. 5 is a partial circuit diagram of any of the above preferred embodiments.

In the above preferred embodiments of the invention, the wireless signal receiver on the TV image conversion device is an infrared ray receiver 61 as shown in FIG. 5. The infrared ray receiver 61 can receive turn-on or turn-off signal transmitted from the multimedia remote control. Next, the turn-on or turn-off signal is sent to the wireless signal decoder via a pin 610 and a corresponding line 71. In the invention the wireless signal decoder is implemented as an infrared ray decoder 62 labeled IRDC 357. The infrared ray decoder 62 is adapted to convert the on/off signal into a control signal which is in turn sent to a logic control line 63 on the TV image conversion device via a voltage control pin 620 and a corresponding line 72. The logic control line 63 is enabled to generate a control signal of either converting a high voltage level into a low voltage level or converting a low voltage level into a high voltage level. The control signal is then sent to a predetermined signal line 64 on the TV image conversion device. The control signal is then sent to a predetermined pin in the computer via the predetermined signal line 64. The predetermined pin is enabled to cause the computer to perform the turn-on or turn-off step. In the above embodiment, the infrared ray receiver 61 and decoder 62 are only exemplary examples of the invention. Note that the invention is not limited to the described embodiment. It is appreciated by those skilled in the art that in practice the TV image conversion device of the invention can consist of other suitable wireless signal receiver and decoder without departing from the scope and spirit of the invention.

In brief, in operation a user can install a TV image conversion device of the invention in a computer. Next, press an on-off switch of a computer to run an embedded multimedia software to play VCD or watch TV. Also, the user can operate a multimedia remote control to select a desired channel for watching or adjust volume. In a case that the user does not want to play VCD or watch TV any more and want to stop using the computer, the user can simply press a computer on-off switch on the multimedia remote control to perform a turn-on or turn-off step of the computer rather than rise to walk to the computer to do the turn-on or turn-off by pressing the on/off switch on the computer. Thus, the TV image conversion device of the invention is a user friendly device. Moreover, the TV image conversion device brings much convenience in computer operation.

While the invention has been described by means of specific embodiments, numerous modifications and variations could be made thereto by those skilled in the art without departing from the scope and spirit of the invention set forth in the claims.

What is claimed is:

1. A TV image conversion device for turning a computer on or off by means of a multimedia remote control, the multimedia remote control including a computer on-off switch, the TV image conversion device being electrically coupled to a computer, and the TV image conversion device including basic control circuits and components required by a conventional TV image conversion device, the TV image conversion device further comprising:
    a wireless signal receiver for receiving a turn-on or turn-off signal transmitted from the multimedia remote control;
    a wireless signal decoder for converting the turn-on or turn-off signal transmitted from the wireless signal receiver into a control signal; and
    a signal transmission line for sending the control signal transmitted from the wireless signal decoder to the computer;
    wherein the computer on-off switch is operative when pressed to cause the multimedia remote control to generate a turn-on or turn-off signal which is transmitted to the wireless signal receiver, the turn-on or turn-off signal is sent from the wireless signal receiver to the wireless signal decoder for converting the turn-on or turn-off signal is converted into a control signal, the control signal is sent to a predetermined pin in the computer for enabling the predetermined pin, the enabled predetermined pin generates a trigger signal by either converting a high voltage level into a low voltage level or converting a low voltage level into a high voltage level, and the computer is enabled by the trigger signal to perform a turn-on or turn-off step,
    wherein the TV image conversion device is a TV card and the signal transmission line includes a signal line having one end coupled to the wireless signal decoder and the other end coupled to the wireless signal receiver so that responsive to pressing the computer on-off switch of the multimedia remote control, a setup program in an embedded BIOS of the computer is operative to set the predetermined pin to an enabled state based on a state of the signal line and cause the BIOS to turn on the computer.

2. The TV image conversion device of claim 1, wherein the signal transmission line includes a bus on the TV card, the bus being inserted in an expansion slot of the computer to contact with the predetermined pin therein.

3. The TV image conversion device of claim 2, wherein the TV image conversion device is a TV image conversion device having a PCI bus.

4. The TV image conversion device of claim 3, wherein the expansion slot is an expansion slot having a PCI bus adapted to receive an inserted portion of a peripheral.

5. The TV image conversion device of claim 1, wherein the TV image conversion device further comprises a logic control line coupled to the wireless signal decoder and the signal transmission line respectively so that responsive to receiving a signal sent from the wireless signal decoder, the logic control line is enabled to generate a control signal and send the same to the signal line, the control signal is sent to the predetermined pin via the signal line, and the predetermined pin is enabled to cause the computer to perform the tun-on or turn-off step.

6. The TV image conversion device of claim 5, wherein the wireless signal receiver is an infrared ray receiver.

7. The TV image conversion device of claim 6, wherein the wireless signal decoder is an infrared ray decoder.

8. A TV image conversion device for turning a computer on or off by means of a multimedia remote control, the multimedia remote control including a computer on-off switch, the TV image conversion device being electrically coupled to a computer, and the TV image conversion device including basic control circuits and components required by a conventional TV image conversion device, the TV image conversion device further comprising:
    a wireless signal receiver for receiving a turn-on or turn-off signal transmitted from the multimedia remote control;
    a wireless signal decoder for converting the turn-on or turn-off signal transmitted from the wireless signal receiver into a control signal; and
    a signal transmission line for sending the control signal transmitted from the wireless signal decoder to the computer;
    wherein the computer on-off switch is operative when pressed to cause the multimedia remote control to generate a turn-on or turn-off signal which is transmitted to the wireless signal receiver, the turn-on or turn-off signal is sent from the wireless signal receiver to the wireless signal decoder for converting the turn-on or turn-off signal is converted into a control signal, the control signal is sent to a predetermined pin in the computer for enabling the predetermined pin, the enabled predetermined pin generates a trigger signal by either converting a high voltage level into a low voltage level or converting a low voltage level into a high voltage level, and the computer is enabled by the trigger signal to perform a turn-on or turn-off step,
    wherein the TV image conversion device is a set-top box and the signal transmission line is a signal line having one end coupled to the wireless signal decoder and the other end coupled to an I/O port in the computer so that responsive pressing the computer on-off switch of the multimedia remote control, a setup program in an embedded BIOS of the computer is operative to set the predetermined pin to an enabled state based on a state of the signal line and cause the BIOS to turn on the computer.

9. The TV image conversion device of claim 8, wherein the TV image conversion device further comprises a logic control line coupled to the wireless signal decoder and the signal transmission line respectively so that responsive to receiving a signal sent from the wireless signal decoder, the logic control line is enabled to generate a control signal and send the same to the signal line, the control signal is sent to the predetermined pin via the signal line, and the predetermined pin is enabled to cause the computer to perform the tun-on or turn-off step.

10. The TV image conversion device of claim 9, wherein the wireless signal receiver is an infrared ray receiver.

11. The TV image conversion device of claim 10, wherein the wireless signal decoder is an infrared ray decoder.

* * * * *